United States Patent [19]

Ash

[11] Patent Number: 5,115,093

[45] Date of Patent: May 19, 1992

[54] PROCESS FOR PREPARING ARYLENE SULFIDE POLYMERS IN THE PRESENCE OF FUNCTIONALIZED OLEFIN

[75] Inventor: Carlton E. Ash, Bartlesville, Okla.

[73] Assignee: Phillips Petroleum Company, Bartlesville, Okla.

[21] Appl. No.: 617,228

[22] Filed: Nov. 23, 1990

[51] Int. Cl.⁵ .............................................. C08G 75/16
[52] U.S. Cl. ..................................... 528/388; 528/373; 528/387; 528/390
[58] Field of Search .............. 528/388, 373, 387, 390, 528/392

[56] References Cited

U.S. PATENT DOCUMENTS

| | | | |
|---|---|---|---|
| 3,354,129 | 11/1967 | Edmonds, Jr. et al. | 268/79 |
| 3,800,845 | 4/1974 | Scoggin | 159/47 |
| 4,337,182 | 6/1982 | Needham | 524/609 |
| 4,415,729 | 11/1983 | Scoggins | 528/388 |
| 4,482,665 | 11/1984 | Dix | 524/262 |
| 4,605,732 | 8/1986 | Heitz et al. | 528/388 |
| 4,767,841 | 8/1988 | Goetz et al. | 528/388 |
| 4,786,711 | 11/1988 | Senatore et al. | 528/388 |
| 4,820,800 | 4/1989 | Geibel et al. | 528/388 |

FOREIGN PATENT DOCUMENTS 384191 8/1990 European Pat. Off. .

*Primary Examiner*—Harold D. Anderson
*Attorney, Agent, or Firm*—Beverly M. Dollar

[57] ABSTRACT

An arylene sulfide polymer and a process for preparing arylene sulfide polymers by contacting a sulfur source, a cyclic organic amide and a dihaloaromatic compound to form a polymerization mixture, polymerizing the polymerization mixture and recovering the arylene sulfide polymer wherein the process is conducted in the presence of a suitable olefin.

16 Claims, No Drawings

PROCESS FOR PREPARING ARYLENE SULFIDE POLYMERS IN THE PRESENCE OF FUNCTIONALIZED OLEFIN

BACKGROUND OF THE INVENTION

This invention relates to the production of arylene sulfide polymers. In one aspect, this invention relates to the production of phenylene sulfide polymers. In another aspect, this invention relates to the production of arylene sulfide polymers having a high extrusion rate or a low inherent viscosity. In a further aspect, this invention relates to the production of arylene sulfide polymers in which the functionality of the polymer end groups is controllable. In a still further aspect, this invention relates to arylene sulfide polymers having alkyl, alkenyl, functionalized alkyl or functionalized alkenyl end groups.

A basic process for the production of arylene sulfide polymers from polyhalo-substituted aromatic compounds by reaction with an alkali metal sulfide in the presence of a polar organic compound is disclosed in U.S. Pat. No. 3,354,129. This patent also discloses that the molecular weight of the arylene sulfide polymers can be reduced by the use of monohalo-substituted aromatic compounds as chain terminating agents or by the use of an excess of one of the reactants, such as p-dichlorobenzene, in the polymerization reaction mixture. The use of excess dihalo-substituted aromatic compound reactant suffers from the disadvantages of increased cost of added reactant materials, difficulty in polymer recovery, and the need for recovering and recycling excess dihalo-substituted aromatic compound to the polymerization zone. In addition, previous attempts to employ monohalo-substituted aromatic compounds as chain terminating agents to obtain arylene sulfide polymers of reduced molecular weight have given generally unsatisfactory results because: (1) either the monohalo compound was so unreactive that it could not compete with the polyhalo-substituted aromatic compound monomer and thus had essentially no effect on the polymer produced in its presence, or (2) the monohalo compound, while activated relative to the polyhalo-substituted aromatic compound, possessed an activating group which was unstable under polymerization and/or polymer recovery conditions thus promoting polymer instability, or (3) the monohalo compound, while activated relative to the polyhalo-substituted aromatic compound, was relatively expensive compared to the polyhalo-substituted aromatic compound.

Arylene sulfide polymers can be characterized at least in part in terms of a melt flow rate. It is generally considered that a melt flow rate is inversely related to molecular weight for polymeric materials in general and for arylene sulfide polymers in particular. Extrusion rate, which is more specifically defined hereinafter, is a specific type of melt flow rate which is particularly useful for characterizing arylene sulfide polymers in the lower molecular weight range. Arylene sulfide polymers can also be characterized at least in part in terms of inherent viscosity. It is generally considered that inherent viscosity, which is more specifically defined hereinafter, is directly related to molecular weight for polymeric materials in general and for arylene sulfide polymers in particular.

Arylene sulfide polymers having a relatively high extrusion rate or relatively low inherent viscosity are desirable for a variety of applications such as encapsulation of electronic components and coating formulations. For example, U.S. Pat. Nos. 4,437,182 and 4,482,665 provide exemplary disclosures of compositions comprising arylene sulfide polymers which are employed in the encapsulation of electronic components.

Arylene sulfide polymers in which the functionality of the polymer end groups is controllable are desirable for improving adhesion of the polymer to metal substrates and/or fiber reinforcement. Such polymers are also desirable for use in the preparation of copolymers by reaction at the polymer end groups having the desired functionality. The copolymers would be particularly useful as compatabilizers in polymer blends.

SUMMARY OF THE INVENTION

It is an object of the invention to provide a process for producing arylene sulfide polymer of a desired extrusion rate or inherent viscosity in a readily controllable manner. It is a further object of the invention to provide a process for producing arylene sulfide polymer in which the functionality of the polymer end groups is readily controllable. It is yet a further object of the invention to provide an arylene sulfide polymer composition having alkyl, alkenyl, functionalized alkyl or functionalized alkenyl end groups.

According to the invention, a process for preparing arylene sulfide polymers is provided which comprises contacting at least one sulfur source, at least one cyclic organic amide, and at least one dihaloaromatic compound to form a polymerization mixture, subjecting the polymerization mixture to polymerization conditions of temperature and time sufficient to form the arylene sulfide polymer, and recovering the arylene sulfide polymer, wherein the process is conducted in the presence of a suitable olefin. In a further embodiment, the olefin may be added to the polymerization mixture prior to subjecting the polymerization mixture to polymerization conditions, or during the time the polymerization mixture is being subjected to polymerization conditions.

Further according to the invention, an arylene sulfide polymer composition is provided comprising end groups resulting from polymerization in the presence of suitable olefins selected from the group consisting of alkyl radicals, alkenyl radicals, functionalized alkyl radicals, functionalized alkenyl radicals and combinations thereof.

DETAILED DESCRIPTION OF THE INVENTION

This invention relates to arylene sulfide polymer compositions and a process for preparing arylene sulfide polymers having a readily controllable molecular weight as measured by extrusion rate or inherent viscosity and/or polymer end group functionality which is readily controllable comprising the steps of: (a) dehydrating an aqueous mixture comprising at least one sulfur source and at least one cyclic organic amide thereby forming a dehydrated mixture, (b) contacting at least one dihaloaromatic compound with the dehydrated mixture to produce a polymerization mixture, (c) subjecting the polymerization mixture to polymerization conditions of temperature and time sufficient to form the arylene sulfide polymer, and (d) recovering the arylene sulfide polymer, wherein the process is conducted in the presence of an olefin having 2 to about 20 carbon atoms. The arylene sulfide polymers having a relatively high extrusion rate or low inherent viscosity made according to this invention are readily recoverable and well suited for use in applications where such relatively high extrusion rate or low inherent viscosity arylene sulfide polymers are desired, e.g. encapsulation of electronic components and coatings. The arylene sulfide polymers having polymer end groups of desired functionality made according to this invention are readily recoverable and well suited for use in applications where such polymer end group functionality is desired, e.g. improved adhesion to metal substrates and/or fiber reinforcement and in the preparation of copolymers for use as blend compatabilizers.

The term "arylene sulfide polymer" is defined by the formula $$-(Ar-S)_i-$$

wherein $$-Ar-S-$$

is the repeating unit, i is the number of repeating units in the polymer molecule, and Ar is selected from the group consisting of

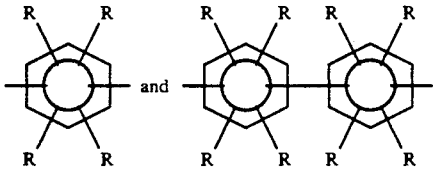

wherein each R is selected from the group consisting of hydrogen and alkyl radicals having 1 to about 4 carbon atoms, the total number of carbon atoms in all of the R groups in the repeat unit being 0 to about 12.

As used throughout the specification, the term "extrusion rate" refers to a flow rate measurement on molten polymer based on ASTM D 1238-86, Condition 315/0.345, modified to use an orifice having a length of 31.8 mm and a 5 minute preheat time. As previously discussed, extrusion rate is a specific type of melt flow measurement which is particularly useful in characterizing arylene sulfide polymers in the lower molecular weight range.

As used throughout the specification, the term "inherent viscosity" (I.V.) refers to dilute solution viscosity which is the ratio of the natural logarithm of the relative viscosity to the polymer solution concentration in grams per deciliter. The relative viscosity is the ratio of the flow time of a specific solution of the polymer to the flow time of the pure solvent. Inherent viscosities for arylene sulfide polymers are measured generally according to the method described in ASTM D 1243-79 wherein samples of dried polymer are dissolved in 1-chloronaphthalene at 210° C. at a polymer concentration of 0.4 grams per deciliter (g/dL) utilizing a No. 50 Cannon-Fenske viscometer. As previously discussed, inherent viscosity is a measurement which is a function of molecular weight and which is particularly useful in characterizing arylene sulfide polymers in the lower molecular weight range.

Suitable olefins which are utilized according to the invention are selected from the group consisting of alkenes having 2 to about 20 carbon atoms, dienes having 2 to about 20 carbon atoms, functionalized alkenes represented by the formulas

 (I)

and

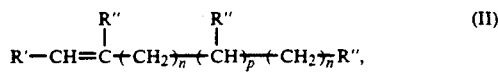 (II)

and functionalized dienes represented by the formula

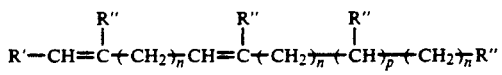

wherein R' is selected from the group consisting of hydrogen and alkyl groups having 1 to about 10 carbon atoms, R" is selected from the group consisting of —H, —CN, —NR'$_2$, —NO$_2$, —aryl,

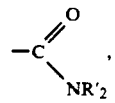

—OR',

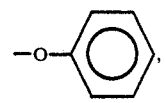

—PO$_3$H, —SO$_3$H, —SO$_2$R',

—PR'$_2$,

and —SiR'$_3$, R''' is selected from the group consisting of —H and —CH$_3$, Y is selected from the group consisting of —H and —COO$^-$, m is 0 or 1, n is 0 to 10, p is 0 or 1, and Y, n and R" in any of the above formulas may be the same or different and wherein the total number of carbon atoms in the functionalized alkene of formula (II) and the functionalized diene is from 2 to about 20 and the total number of carbon atoms in the functionalized alkene of formula (I) is 3 or 4. A Y group of COO$^-$ can be obtained by addition of the corresponding carboxylate salt or it can be prepared in-situ by reaction of the free carboxylic acid with a stoichiometric amount of a base, e.g. an alkali metal hydroxide. The alkenes, dienes, functionalized alkenes of formula (II) and functionalized dienes which are employed according to the invention are compounds having 2 to about 20 carbon atoms per molecule, preferably about 4 to about 9 carbon atoms per molecule, and most preferably about 5 to about 7 carbon atoms per molecule.

Examples of suitable olefins which can be employed in the process of the invention include 1-butene, 1-pentene, 1-hexane, 1-heptene, 1-nonene, 2-butene, 3-methyl-1-butene, 1,3-butadiene, 1,3-pentadiene, 1,4-pentadiene, 1,5-hexadiene, 2-methyl-1,3-butadiene, 3-butenoic acid, 4-pentenenitrile, 4-penten-1-ol, 4-methyl-3-penten-2-one, 5-amino-4-methyl-1-hexene, 2-methyl-6-methylamino-2-heptene and 6-methyl-5-hepten-2-one, and the like, and mixtures of any two or more thereof. The presently preferred compounds are 1-heptene, 1,5-hexadiene, 1-nonene, and 3-butenoic acid because of their effectiveness.

The amount of olefin employed according to the process of the invention can be conveniently expressed in terms of a molar ratio based on the sulfur source. Broadly, the molar ratio of olefin to sulfur source will be about 0.02:1 to about 0.3:1, preferably about 0.05:1 to about 0.25:1, and most preferably about 0.1:1 to about 0.2:1. The olefin will be effective in the process of the invention when added to the polymerization mixture prior to subjecting the polymerization mixture to polymerization conditions, or during the time the polymerization mixture is being subjected to polymerization conditions. If an aqueous sulfur-containing compound is used and a dehydration step is required, the olefin may only be added prior to dehydration if the olefin is not volatile under dehydration conditions.

The dihaloaromatic compounds which are employed according to the invention are compounds having 6 to about 22 carbon atoms per molecule. The halogen substituent on the dihaloaromtic compound can be selected from the group consisting of chlorine, bromine and iodine. Preferably, the dihaloaromatic compound will be dihalo-substituted benzene and more preferably dichloro-substituted benzene. Particularly good results are expected when the dihaloaromatic compound is selected from the group consisting of p-dichlorobenzene and mixtures of p-dichlorobenzene with a total of about 0 to about 10 mole percent of at least one of m-dichlorobenzene, o-dichlorobenzene and alkyl-substituted dichlorobenzene having the formula

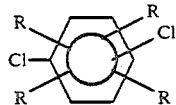

wherein R is as defined herein and at least one R is not hydrogen.

Examples of some suitable dihaloaromatic compounds include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1,2,4,5-tetrabutyl-3,6-dichlorobenzene, 1-ethyl-3-butyl-2,5-dichlorobenzene, 1-ethyl-2,5-diiodobenzene, 1-butyl-2,5-dichlorobenzene, 1-butyl-4-ethyl-2,5-dibromobenzene, o-dichlorobenzene, m-dichlorobenzene and the like, and mixtures of any two or more thereof. The presently preferred dihaloaromatic compound is p-dichlorobenzene because of its effectiveness and commercial availability.

The cyclic organic amide used in the process of the invention should be substantially liquid at the reaction temperatures and pressures employed. The cyclic organic amides can have 5 to about 12 carbon atoms per molecule. Examples of some suitable cyclic organic amides include N,N'-ethylenedipyrrolidone, N-methyl-2-pyrrolidone, pyrrolidone, caprolactam, N-ethyl caprolactam, N-methyl caprolactam and mixtures thereof. The presently preferred cyclic organic amide is N-methyl-2-pyrrolidone because of its effectiveness and commercial availability. The amount of cyclic organic amide employed according to the process of the invention can be expressed in terms of a molar ratio of cyclic organic amide to sulfur source compounds. Broadly, the molar ratio of cyclic organic amide to sulfur source compound will be about 1.5:1 to about 25:1, preferably about 2:1 to about 8:1.

In accordance with the invention, suitable sulfur sources which can be employed in the production of the arylene sulfide polymers include alkali metal sulfides, alkali metal bisulfides, N-methyl-2-pyrrolidinethione, and hydrogen sulfide. Further according to the invention, the alkali metal sulfides can be employed with good results in the absence of any added alkali metal hydroxide whereas the other suitable sulfur sources are preferably employed in the process of the invention in the presence of an added alkali metal hydroxide. For the alkali metal bisulfides and N-methyl-2-pyrrolidinethione, the amount of added alkali metal hydroxide will generally be in the range of from about 0.3:1 to about 4:1, preferably about 0.4:1 to about 2:1 moles per mole of alkali metal bisulfides or N-methyl-2-pyrrolidinethione. When hydrogen sulfide is employed as the sulfur source, the amount of added alkali metal hydroxide is generally within the range of about 1.3:1 to about 5:1 preferably about 1.4:1 to about 3:1 moles per mole of hydrogen sulfide employed.

Alkali metal hydroxides that can be employed according to the invention include lithium hydroxide, sodium hydroxide, potassium hydroxide, rubidium hydroxide, cesium hydroxide, and mixtures thereof. Sodium hydroxide is preferred because of ready availability and good results obtained using this compound. The alkali metal hydroxide can conveniently be utilized in the process of the invention as an aqueous solution. For example, an aqueous solution of sodium hydroxide having about 50 weight percent sodium hydroxide is convenient to use.

Alkali metal bisulfides that can be employed according to the invention include sodium bisulfide, lithium bisulfide, potassium bisulfide, rubidium bisulfide, cesium bisulfide, and mixtures thereof. Sodium bisulfide is preferred because of ready availability and good results obtained therewith. The alkali metal bisulfide can conveniently be utilized in the process of the invention as an aqueous solution. For example, an aqueous solution of sodium bisulfide having about 60 weight percent sodium bisulfide is convenient to use.

Alkali metal sulfides which can be employed in the process of the invention include lithium sulfide, sodium sulfide, potassium sulfide, rubidium sulfide, cesium sulfide, and mixtures thereof. The alkali metal sulfide can be used in anhydrous form, as a hydrate, or as an aqueous mixture. Sodium sulfide is preferred because of ready availability and good results obtained therewith.

While the ratio of reactants for the preparation of arylene sulfide polymers according to the invention can vary considerably, the ratio of moles of dihaloaromatic compound to atoms of divalent sulfur in the sulfur source should be within the range of about 0.8:1 to about 2:1, preferably about 0.95:1 to about 1.3:1.

In another embodiment of the invention, a polymerization modifier such as an alkali metal carboxylate can be employed in the process of the invention particularly when the olefin utilized is a functionalized alkene or a functionalized diene. The alkali metal carboxylates that can be employed in the process of the invention can be represented by the formula R''''CO$_2$M where R'''' is a hydrocarbyl radical selected from alkyl, cycloalkyl, and aryl and combinations thereof such as alkaryl, aralkyl, and the like, the number of carbon atoms in said R'''' being within the range of 1 to about 20, and M is an alkali metal selected from lithium, sodium, potassium, rubidium, and cesium.

Examples of some alkali metal carboxylates that can be employed in the process of the invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyl octanoate, potassium dodecanoate, rubidium 4-ethyltetradecanoate, sodium octadecanoate, sodium heneicosanoate, lithium cyclohexane carboxylate, cesium cyclododecane carboxylate, sodium 3-methylcyclopentane carboxylate, potassium cyclohexylacetate, potassium benzoate, lithium benzoate, sodium benzoate, potassium m-toluate, lithium phenylacetate, sodium 4-phenylcyclohexane carboxylate, potassium p-tolylacetate, lithium 4-ethylcyclohexylacetate and the like and mixtures thereof. The presently preferred alkali metal carboxylate is sodium acetate because of its effectiveness and commercial availability.

The amount of alkali metal carboxylate employed according to the invention can be expressed in terms of molar ratio based on the sulfur source compound employed. Broadly, the molar ratio of alkali metal carboxylate to sulfur source compound will be from about 0.002:1 to about 4:1, preferably about 0.1:1 to about 2:1. The alkali metal carboxylate can be used in anhydrous form, as a hydrate, or as an aqueous mixture.

Suitable polymerization conditions include a reaction temperature which can vary over a wide range but will generally be within the range of about 200° C. to about 450° C., preferably from about 210° C. to about 350° C. The reaction time will be within the range of about 10 minutes to about 72 hours and preferably about 1 hour to about 8 hours. The pressure need only be sufficient to maintain the dihaloaromatic compound and the cyclic organic amide substantially in the liquid phase, and to substantially retain the sulfur source therein.

Although various known methods can be employed for the recovery of the arylene sulfide polymers made according to the invention, it is preferred to employ a method, such as the one described in U.S. Pat. No. 3,800,845, wherein the heated polymerization mixture is subjected to an isothermal evaporation reducing the pressure on the polymerization mixture from reaction pressure sufficiently to evaporate essentially all of the water and approximately one third of the cyclic organic amide and then removing the concentrated polymerization mixture to another vessel flashing the mixture adiabatically to about atmospheric pressure to remove essentially all the cyclic organic amide from the arylene sulfide polymer. The flashed reaction mixture residue can be slurried with a liquid diluent such as water in which the alkali metal halides and other impurities are soluble. The liquid diluent is removed with dissolved impurities such as by filtration leaving a particular arylene sulfide polymer. This washing process can be repeated until the desired level of arylene sulfide polymer purity is attained. Another known method that can be employed is the "water quench" process described in U.S. Pat. No. 4,415,729, wherein the polymerization mixture is contacted at a temperature above that at which the arylene sulfide polymer is soluble in the polymerization mixture with a sufficient amount of a separation agent that is soluble in the cyclic organic amide and is a non-solvent for the arylene sulfide polymer, e.g. water, to cause or enhance a phase separation. Subsequent cooling of the quenched, phase-separated mixture produces a slurry of particulate arylene sulfide polymer in the cyclic organic amide which can be filtered to recover the particulate arylene sulfide polymer. The separated polymer can be washed as described above.

The arylene sulfide polymer composition will comprise end groups selected from the group consisting of alkyl radicals having 2 to about 20 carbon atoms, alkenyl radicals having 2 to about 20 carbon atoms, functionalized alkyl radicals derived from the formula (I) having 3 or 4 carbon atoms, functionalized alkyl radicals derived from the formula (II) having 2 to about 20 carbon atoms, functionalized alkenyl radicals having 2 to about 20 carbon atoms and combinations thereof wherein the end groups are a result of the use of olefins as defined herein according to the process of the invention.

The above defined arylene sulfide polymer composition end groups will comprise structures selected from the group consisting of

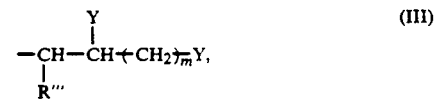 (III)

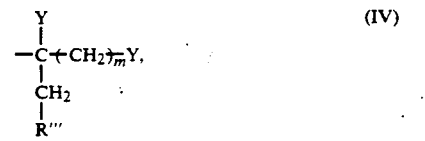 (IV)

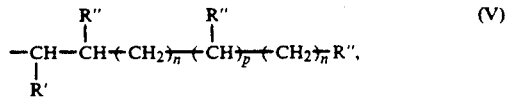 (V)

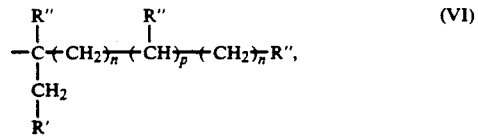 (VI)

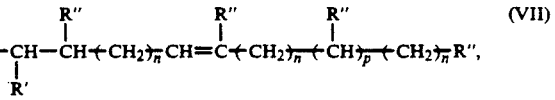 (VII)

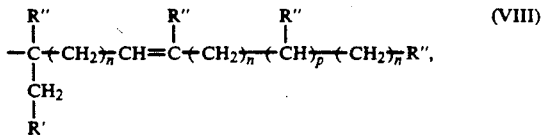 (VIII)

 (IX)

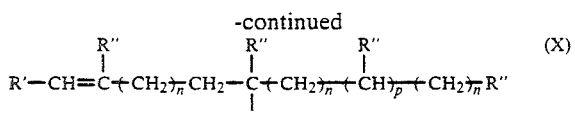

and combinations thereof wherein m, n, p, R', R", R'" and Y are as defined herein and Y, n and R" in any of end groups (III)–(X) may be the same or different, and wherein the total number of carbon atoms in the end groups of formulas (III) and (IV) is 3 or 4, and the total number of carbon atoms in the end groups of formulas (V), (VI), (VII), (VIII), (IX) and (X) is 2 to about 20.

EXAMPLES

In the following examples, the term "extrusion rate" refers to a melt flow rate for polyphenylene sulfide (PPS) based on ASTM D 1238-86, Condition 315/0.345, modified to use an orifice with a length of 31.8 mm and a 5 minute preheat time. Extrusion rate units are g/10 min. The polymer inherent viscosity (IV) is the dilute solution viscosity of PPS based on the procedure described in ASTM D 1243-79. Samples of the dried PPS are dissolved in 1-chloronaphthalene at 210° C. at a concentration of 0.4 grams per deciliter (g/dL) and the IV determined utilizing a No. 50 Cannon-Fenske viscometer. The units of IV are dL/g.

Polymer thermal transitions were determined by differential scanning calorimetry (DSC) on a Perkin-Elmer DSC, Model DSC-2, with a nitrogen atmosphere at a sample heating rate of 20° C./min. The polymer glass transition (Tg) and melting point (Tm) are reported as °C.

Polymer ash levels were determined by burning a weighed sample of the polymer in a platimum dish. Residual carbonaceous material was removed by heating the residue at 540° C. in a muffle furnace. The weight of the residue (ash) is expressed as a percentage of the original weight of the polymer.

The polymer chlorine content was determined by neutron activation, with the results reported as weight percent chlorine based on the original sample weight. Fourier transform infrared (FTIR) spectra were determined using film pressed from the polymer without heat. The presence of alkyl groups was indicated by a peak at approximately 2925 cm−1.

EXAMPLE 1

This example is a control run in which PPS is made without the addition of an olefin. A one-liter, stainless steel reactor was charged with 1.00 g-mol of sodium hydrosulfide (NaSH) as an aqueous mixture containing about 60 weight percent NaSH, 1.03 g-mol sodium hydroxide (NaOH) as a solid, and 2.5 g-mol N-methyl-2-pyrrolidone (NMP). The reactor was closed and, with the stirrer started, was purged 5 times with nitrogen. After the reactor temperature had been increased to about 150° C., dehydration was carried out to remove water as the reactor temperature increased to about 204° C.

To the dehydrated mixture in the reactor was added 1.03 g-mol p-dichlorobenzene (DCB) and 1.0 g-mol NMP. The reactor was heated to 235° C. and held at 235° C. for one hour. Then the reactor was heated to 265° C. and held at 265° C. for two hours. The reactor was cooled to about 130° C. and allowed to stand overnight.

A grey polymer was removed from the opened reactor and slurried in 2-propanol in a Waring blender. The suspension was filtered to remove the solid polymer and then washed with hot (approx. 80° C.) water (7 times, approx. 1 L). After the washed polymer was dried at 120° C. in a vacuum oven, the off-white product was recovered in a yield of 92 mole percent. Polymer 1 had an extrusion rate of 71 g/10 min and an IV of 0.16 dL/g. The polymer Tg was 85° C. and the Tm was 291° C.

EXAMPLE 2

An invention run involving the addition of 1-nonene to a PPS polymerization is presented in this example. Polymerization run 2 was carried out using the procedure described in Example 1 except that 0.25 g-mol of 1-nonene was charged to the reactor with the DCB and NMP after the dehydration step and the reaction mixture was held at 235° C. for one hour and at 265° C. for 2.4 hours.

An off-white polymer was recovered in a yield of 94 mole percent. Attempts to determine the extrusion rate were not successful since the molten polymer was too fluid to obtain a value. The polymer IV was 0.12 dL/g and the IR spectrum showed that alkyl groups are present in the polymer. Adding 1-nonene to the polymerization incorporated alkyl groups into the polymer and reduced the polymer melt and solution viscosities, i.e. the polymer molecular weight.

EXAMPLE 3

Another invention run was carried out using 1-nonene and a mixture of meta- and para-dichlorobenzene to produce a PPS copolymer suitable for solution nuclear magnetic resonance (NMR) spectral studies to establish the presence of alkyl groups. PPS polymerization run 3 was carried out in a manner similar to that described in Example 2 except that the dehydrated mixture was charged with 0.515 g-mol meta-DCB and 0.515 g-mol para-DCB with the 0.25 g-mol 1-nonene and NMP. In this polymerization, the polymerization mixture was held at 235° C. for one hour and at 265° C. for two hours.

The product of this polymerization was a copolymer recovered in a yield of 56 mole percent with an IV of 0.06 dL/g. The polymer Tg was about 25° C. Carbon-13 NMR spectra of the copolymer in benzene and tetrahydrofuran (THF) showed that the polymer contained alkyl groups.

EXAMPLE 4

A control run was carried out in the absence of DCB to determine if any polyolefin is produced from the 1-nonene added to a PPS polymerization. Run 4 was done in a manner similar to that described in Example 2 except that the reactor was charged with 0.5 g-mol NaSH, 0.5 g-mol NaOH, and 1.25 g-mol NMP and the dehydrated mixture was charged with 0.5 g-mol 1-nonene and 0.5 g-mol NMP. No DCB was added to the dehydrated mixture. The mixture was held at 235° C. for one hour and at 265° C. for two hours.

After the reaction had been exposed to conditions noted in Example 1, the addition of a large quantity of water to the mixture revealed that no polyolefin was formed as evidenced by the lack of a precipitate forming upon addition of the water. The conditions used for the PPS polymerization do not produce any significant amounts of polyolefins from the added olefins.

EXAMPLE 5

Two more invention runs were carried out using 1-heptene as the added olefin. A polymerization procedure similar to that described in Example 1 was used. In all runs in this example, 1.01 g-mol of DCB was used. Run 5 is a control run made without an added olefin. Run 6 used 0.25 g-mol 1-heptene added with the DCB and NMP charged to the dehydrated mixture. Run 7 used 0.25 g-mol 1-heptene and 0.3 g-mol sodium acetate (NaOAc) added to the dehydrated mixture. The polymerization conditions for run 7 were 1 hour at 235° C. and three hours at 265° C. Table I summarizes the chemicals used and the results of these runs.

TABLE I

| | Polymerizations with 1-Heptene | | | | | |
|---|---|---|---|---|---|---|
| Run | NaOH, g-mol | 1-Heptene g-mol | NaOAc, g-mol | Polymer Yield, mol % | Extrusion Rate g/10 min | IV, dL/g |
| 5 | 1.0 | 0 | 0 | 93 | 29 | a |
| 6 | 1.0 | 0.25 | 0 | 91 | b | 0.15 |
| 7 | 1.0 | 0.25 | 0.30 | 88 | 88 | 0.17 | a Not determined
b Too Fluid to measure

The extrusion rates of polymers 6 and 7 are higher than for control run 5. IR spectra of polymers 6 and 7 show that alkyl groups are present in the polymer. The presence of sodium acetate in run 7 does not significantly effect the polymer molecular weight. 1-Heptene added to a PPS polymerization is incorporated into the polymer and reduces the PPS melt viscosity.

EXAMPLE 6

An invention run was carried out with an unsaturated carboxylic acid added to the polymerization to determine the effect of unsaturated carboxylic acid salts on PPS polymerizations. In control run 8, 0.25 g-mol of 4-pentenoic acid was charged with the NaSH, NaOH and NMP before dehydration in a polymerization procedure similar to that described for run 5 in Example 5. In invention run 9, 0.29 g-mol 3-butenoic acid was charged with the NaSH, NaOH and NMP before dehydration. Both polymerizations were carried out for one hour at 235° C. and three hours at 265° C. Additional NaOH was used in these polymerization runs for neutralization of the acid groups. The chemicals used and the results of these two runs are summarized in Table II. Run 5 from Example 5 is included in the table for comparision.

TABLE II

| | Polymerization With Unsaturated Carboxylic Acid Salts | | | | |
|---|---|---|---|---|---|
| Run | NaOH, g-mol | Unsaturated Carboxylic Acid, g-mol | Polymer Yield, mol % | Extrusion Rate, g/10 min | IV, dL/g |
| 5 | 1.0 | none | 93 | 29 | a |
| 8 | 1.25 | 4-Pentenoic Acid, 0.25 | >82 | 25 | 0.22 |
| 9 | 1.29 | 3-Butenoic Acid, 0.29 | 89 | b | a | a Not determined
b Too Fluid to measure

Control run 8 with 4-pentenoic acid did not produce a decrease in the polymer melt viscosity. An FTIR spectrum of the polymer from run 8 showed no alkyl groups to be present while an FTIR spectrum of the polymer from run 9 did show the presence of alkyl groups. These results show that selected unsaturated carboxylic acid salts can be utilized in the PPS polymerization to decrease the polymer melt viscosity.

EXAMPLE 7

A series of polymerizations was carried out using added 1-heptene to determine the effect of reactor metallurgy and reaction conditions on the olefin incorporation in a PPS polymerization. All runs used 1.00 g-mol NaOH and 1.01 g-mol DCB. The polymerization procedure was similar to that described in Examples 1 and 2.

Run 10 is a control run made in a titanium reactor without any added 1-heptene and with polymerization conditions of one hour at 235° C. and two hours at 265° C. Run 11 is an invention run made in a 316 stainless steel reactor with 0.25 g-mol 1-heptene and polymerization conditions of three hours at 245° C. Runs 12 through 16 all used a titanium reactor and 0.25 g-mol 1-heptene. 0.30 g-mol of NaOAc was also present in run 16. The polymerization conditions for run 12 were three hours at 245° C.; run 13, 2.5 hours at 255° C.; run 14, 4 hours at 235° C.; run 15, two hours at 265° C.; and run 16, three hours at 265° C. The chemicals used and the results of these runs are summarized in Table III.

TABLE III

| | Polymerization with 1-Heptene | | | | | |
|---|---|---|---|---|---|---|
| Run | 1-Heptene g-mol | NaOAc, g-mol | Reactor Metal | Polymer Yield, mol % | Extrusion Rate, g/10 min | IV, dL/g |
| 10 | 0 | 0 | Ti | 94 | 23 | a |
| 11 | 0.25 | 0 | SS | 92 | b | a |
| 12 | 0.25 | 0 | Ti | 94 | b | 0.08 |
| 13 | 0.25 | 0 | Ti | 94 | b | 0.09 |
| 14 | 0.25 | 0 | Ti | 92 | b | 0.12 |
| 15 | 0.25 | 0 | Ti | 94 | b | 0.10 |
| 16 | 0.25 | 0.30 | Ti | 95 | b | 0.07 | a Not determined
b Too Fluid to measure

In runs 11 through 16, the reaction of the olefin occurred to give a lower melt viscosity polymer than control Polymer 10. Changes in reactor metallurgy from 316 stainless steel to titanium and changes in polymerization temperatures and times did not significantly change the polymerization results. Sodium acetate (run 16) can be present without significant changes in the polymerization results.

EXAMPLE 8

The use of a diene in the PPS polymerization is demonstrated in this example. PPS polymerization run 17 was carried out in a manner similar to that described in run 11 of Example 7 except that 0.1 g-mol of 1,5-hexadiene was added to the dehydrated mixture instead of 1-heptene.

The polymer was recovered in a 90 mole percent yield and had an extrusion rate of 104 g/10 min. This shows that dienes can be used to reduce the PPS melt viscosity.

EXAMPLE 9

A control PPS polymerization was carried out to produce a truly low molecular weight PPS for comparison with the products of the invention runs above. Run 18 was carried out in a procedure similar to that described in Example 1 except that the reactor was charged with 0.5 g-mol NaSH, 0.5 g-mol NaOH, and 1.25 g-mol NMP. The dehydrated mixture was charged with 1.03 g-mol DCB and 1.0 g-mol NMP. Due to the large excess of DCB over the sulfur source, a very low molecular weight PPS was produced. Polymer 18 was recovered in 94 mole percent yield and had a degree of polymerization of about 13 as determined by $^{13}$C NMR.

The comparison of runs 1, 2, 13-15 and 18 can be found in Table IV. The product of run 18 was too fluid in the melt to measure an extrusion rate, but had an IV of 0.11 dL/g. A low molecular weight was indicated by the low polymer Tg (below 40° C.) and Tm (272° C.). The very high chlorine level of 4.97 weight percent indicates the large number of chlorine end-groups present. In contrast, polymers from invention runs 2, 13, 14, and 15 have similar IV values, but much higher Tg and Tm values and lower chlorine levels. Control run 1 is included in the table for comparison. The invention polymers have reduced melt and solution viscosities compared with control run 1, but maintain only modest decreases in PPS thermal transitions.

TABLE IV

| | | PPS Comparisons | | | |
|---|---|---|---|---|---|
| Run | Type | Extrusion Rate, g/10 min | IV, dL/g | Tg, °C. | Tm, °C. | Chlorine, wt % |
| 1 | Control PPS | 71 | 0.16 | 85 | 291 | 0.37 |
| 18 | Low MW PPS | a | 0.11 | <40 | 272 | 4.97 |
| 2 | PPS/1-nonene | a | 0.12 | b | b | 0.45 |
| 13 | PPS/1-heptene | a | 0.09 | 75 | 285 | 0.50 |
| 14 | PPS 1-heptene | a | 0.12 | 70 | 286 | 0.84 |
| 15 | PPS/1-heptene | a | 0.10 | 74 | 286 | 0.58 | a Too fluid to measure
b Not determined

That which is claimed is:

1. A process for preparing arylene sulfide polymers comprising the steps of:
   (a) contacting at least one sulfur source, at least one cyclic organic amide, and at least one dihaloaromatic compound to form a polymerization mixture,
   (b) subjecting said polymerization mixture to polymerization conditions of temperature and time sufficient to form said arylene sulfide polymer, and
   (c) recovering said arylene sulfide polymer, wherein said process is conducted in the presence of an olefin selected from the group consisting of alkenes having 2 to about 20 carbon atoms, dienes having 2 to about 20 carbon atoms, functionalized alkenes having the formula

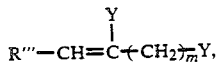

$$R'''-CH=C+CH_2\!\!\rightarrow_m\!Y, \quad (I)$$

functionalized alkenes having the formula

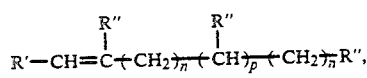

$$R'-CH=C+CH_2\!\!\rightarrow_n\!CH\!\!\rightarrow_p\!+CH_2\!\!\rightarrow_n\!R'', \quad (II)$$

and functionalized dienes having the formula

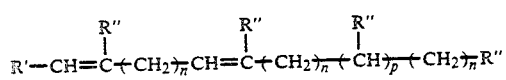

$$R'-CH=C+CH_2\!\!\rightarrow_n\!CH=C+CH_2\!\!\rightarrow_n\!+CH\!\!\rightarrow_p\!+CH_2\!\!\rightarrow_n\!R''$$

wherein R' is selected from the group consisting of hydrogen and alkyl groups having 1 to about 10 carbon atoms, R" is selected from the group consisting of —H, —CN, —NR'$_2$, —NO$_2$, —aryl,

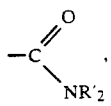

—OR',

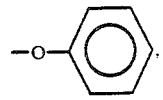

—PO$_3$H, —SO$_3$H, —SO$_2$R',

—PR'$_2$,

and —SiR'$_3$, R''' is selected from the group consisting of —H and —CH$_3$, Y is selected from the group consisting of —H and —COO$^-$ wherein COO$^-$ is obtained by addition of the corresponding carboxylate salt or is prepared in-situ by reaction of the free carboxylic acid with a stoichiometric amount of a base, m is 0 or 1, n is 0 to 10, p is 0 or 1 and Y, n and R" in any of said formulas are the same or different, and wherein the total number of carbon atoms in said functionalized alkene of formula (II) and said functionalized diene is from 2 to about 20 and the total number of carbon atoms in said functionalized alkene of formula (I) is 3 or 4.

2. A process according to claim 1 wherein the molar ratio of said olefin to said sulfur source is about 0.02:1 to about 0.3:1.

3. A process according to claim 2 wherein said olefin is added to said polymerization mixture prior to subjecting said polymerization mixture to polymerization conditions.

4. A process according to claim 2 wherein said olefin is added during the time said polymerization mixture is being subjected to polymerization conditions.

5. A process according to claim 3 wherein said sulfur source is selected from the group consisting of alkali metal sulfides, alkali metal bisulfides, N-methyl-2-pyrrolidinethione and hydrogen sulfide.

6. A process according to claim 5 wherein said polymerization mixture further comprises an alkali metal hydroxide.

7. A process according to claim 6 wherein said cyclic organic amide comprises N-methyl-2-pyrrolidone and wherein said dihaloaromatic compound is selected from the group consisting of p-dichlorobenzene, and mixtures of p-dichlorobenzene with a total of about 0 to about 10 mole percent of at least one of m-dichlorobenzene, o-dichlorobenzene, and alkyl-substituted dichlorobenzene having the formula

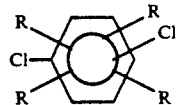

wherein R is hydrogen or an alkyl group of 1 to about 4 carbon atoms and at least one R is not hydrogen.

8. A process according to claim 7 wherein said alkali metal bisulfide comprises sodium bisulfide, said alkali metal hydroxide comprises sodium hydroxide, and said dihaloaromatic compound comprises p-dichlorobenzene.

9. A process according to claim 4 wherein said sulfur source is selected from the group consisting of alkali metal sulfides, alkali metal bisulfides, N-methyl-2-pyrrolidinethione and hydrogen sulfide.

10. A process according to claim 9 wherein said polymerization mixture further comprises an alkali metal hydroxide.

11. A process according to claim 10 wherein said cyclic organic amide comprises N-methyl-2-pyrrolidone and wherein said dihaloaromatic compound is selected from the group consisting of p-dichlorobenzene, and mixtures of p-dichlorobenzene with a total of about 0 to about 10 mole percent of at least one of m-dichlorobenzene, o-dichlorobenzene, and alkyl-substituted dichlorobenzene having the formula

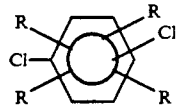

wherein R is hydrogen or an alkyl group of 1 to about 4 carbon atoms and at least one R is not hydrogen.

12. A process according to claim 11 wherein said alkali metal bisulfide comprises sodium bisulfide, said alkali metal hydroxide comprises sodium hydroxide, and said dihaloaromatic compound comprises p-dichlorobenzene.

13. A process according to claim 2 wherein said polymerization mixture further comprises an alkali metal carboxylate.

14. A process for preparing poly(phenylene sulfide) comprising the steps of:
(a) dehydrating an aqueous mixture comprising sodium bisulfide, sodium hydroxide and N-methyl-2-pyrrolidone thereby forming a dehydrated mixture,
(b) contacting p-dichlorobenzene with said dehydrated mixture to produce a polymerization mixture,
(c) subjecting said polymerization mixture to polymerization conditions of temperature and time sufficient to form said poly(phenylene sulfide), and
(d) recovering said poly(phenylene sulfide), wherein said process is conducted in the presence of an olefin selected from the group consisting of 1-heptene, 1-nonene, 1,5-hexadiene, and 3-butenoic acid.

15. An arylene sulfide polymer composition comprising end groups selected from the group consisting of

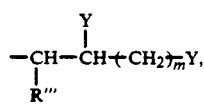

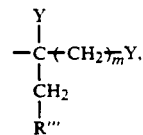

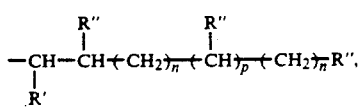

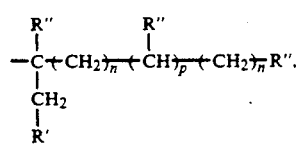

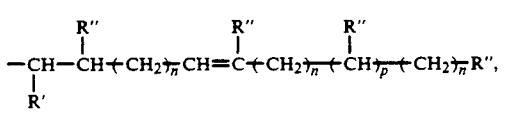

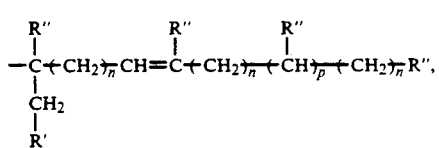

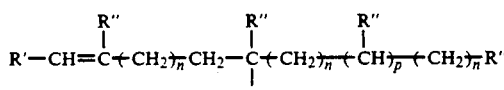

and combinations thereof wherein R' is selected from the group consisting of hydrogen and alkyl groups having 1 to about 10 carbon atoms, R" is selected from the group consisting of —H, —CN, —NR'$_2$, —NO$_2$, —aryl,

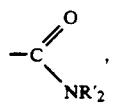

—OR',

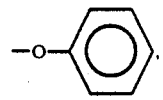

—PO$_3$H, —SO$_3$H, —SO$_2$R',

—PR'$_2$,

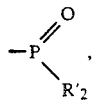

and —SiR'₃, R''' is selected from the group consisting of —H and —CH₃, Y is selected from the group consisting of —H and —COO⁻ wherein COO⁻ is obtained by addition of the corresponding carboxylate salt or is prepared in-situ by reaction of the free carboxylic acid with a stoichiometric amount of a base, m is 0 or 1, n is 0 to 10, p is 0 or 1 and Y, n and R'' in any of said end groups are the same or different, and wherein the total number of carbon atoms in said end groups of formulas (III) and (IV) is 3 or 4, and the total number of carbon atoms in said end groups of formulas (V), (VI), (VII), (VIII), (IX) and (X) is 2 to about 20.

16. A composition according to claim 15 wherein said arylene sulfide polymer is poly(phenylene sulfide).

* * * * *